Sept. 21, 1937.　　　A. CAMPBELL ET AL　　　2,093,597
TRANSMISSION MECHANISM FOR TWO MOVEMENTS
AND IN DIRECTIONAL SIGNALS FOR VEHICLES
Filed May 12, 1936　　　2 Sheets-Sheet 1
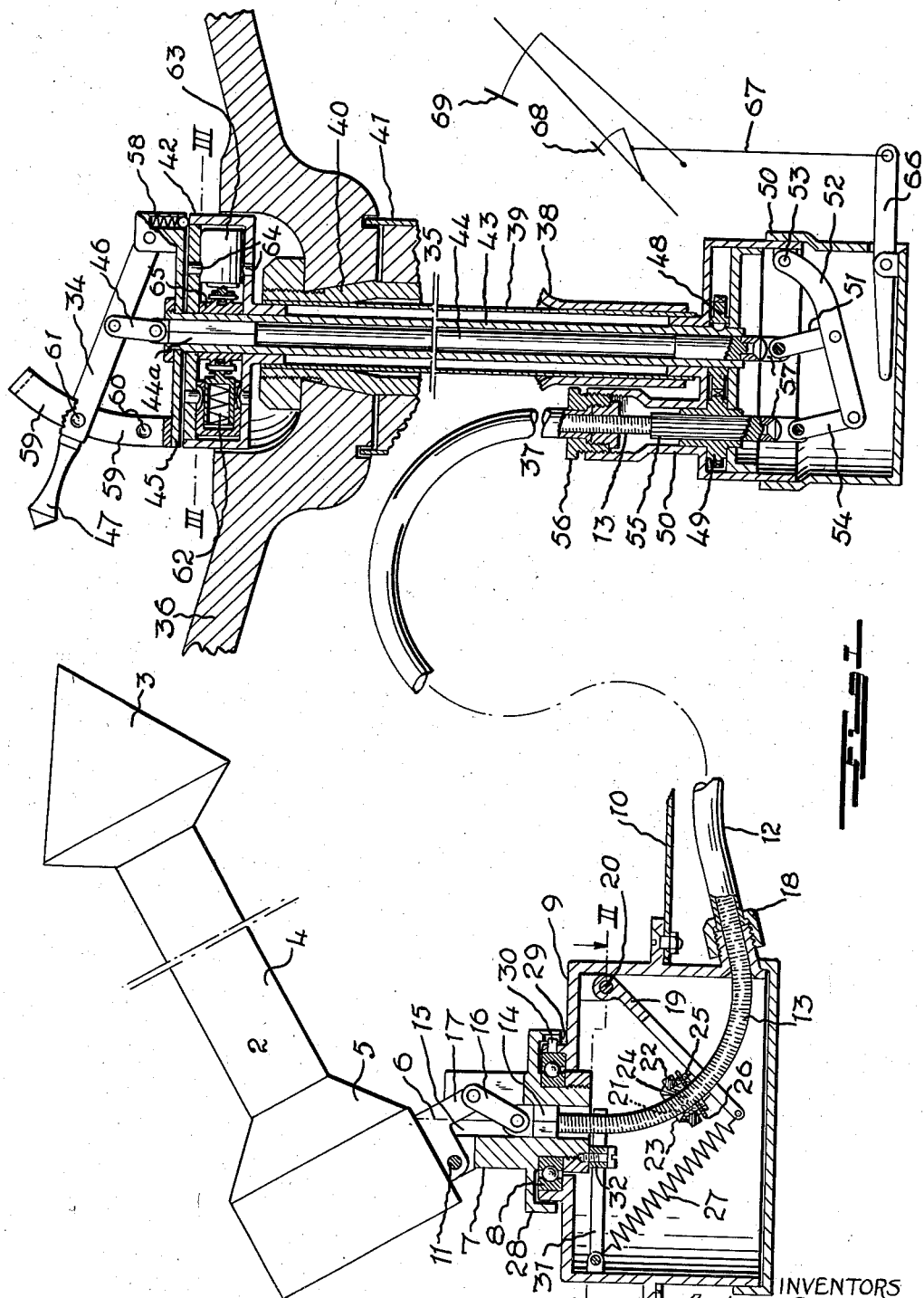

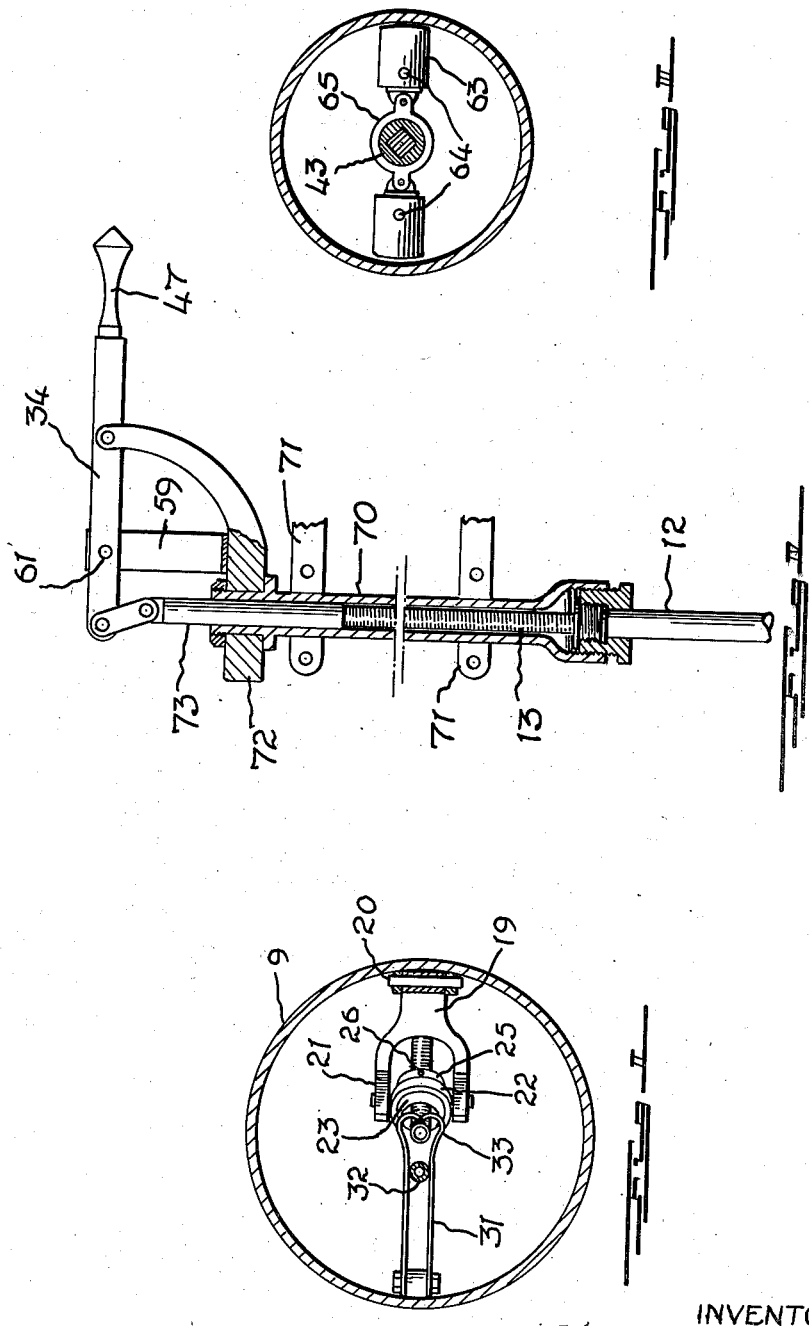

Patented Sept. 21, 1937

2,093,597

UNITED STATES PATENT OFFICE 2,093,597

TRANSMISSION MECHANISM FOR TWO MOVEMENTS AND IN DIRECTIONAL SIGNALS FOR VEHICLES

Andrew Campbell, Adolph Goldsmith, and Fred Kennedy White, Johannesburg, Transvaal, Union of South Africa; said Goldsmith and said White assignors to said Campbell Application May 12, 1936, Serial No. 79,234. In the Union of South Africa March 24, 1936

3 Claims. (Cl. 116—47)

This invention has reference to mechanism for transmitting, to a distant movable member, two motions which may be simultaneous or not. The mechanism is particularly adapted for the case where at least one of the motions to be imparted to the member is rotary and is transmitted as such. The invention is also particularly adapted for transmitting the motion of an operating handle constrained for rotary motion and also angular motion relatively to the axis of the rotary motion, to a distant movable member similarly constrained.

It has been proposed to employ such a member as the visual signal member of apparatus for signalling the intended manoeuvres of a vehicle in which apparatus the member is shaped as an arrow and is mounted on the roof of the vehicle; said arrow member normally pointing forward but being arranged to rotate to the right or left for indicating a turning movement of the vehicle, and to be brought to a vertical position to indicate intention to slow down or stop.

A specific object of the invention is to provide mechanism for operating a movable and directionally significant signal member as last described, from the driver's position within the vehicle. A further object of the invention is to provide, at the driver's end of such apparatus, an actuating handle the movements of which are similar to those of the signal member, although not necessarily similarly oriented.

A vehicle signalling installation according to the invention is shown in the accompanying drawings in which:

Figure I shows the apparatus in sectional elevation.

Figure II is a horizontal section on II—II, Figure I.

Figure III is a horizontal section on III—III, Figure I.

Figure IV is a sectional elevation of an alternative actuating device.

The visual member of the installation is of directionally significant form and is shown shaped as a conventional arrow indicated generally by 2 and comprising a head 3, a shaft 4 and a tail 5. Its normal position is horizontal and pointing ahead of the vehicle. By the means hereafter described, it can be rotated 90° about the vertical axis 6 either way from its normal position to indicate a left or right turn and can also be tilted ahead upward to indicate slowing down or stopping. The drawings show it partially tilted up.

For its rotation the arrow is mounted upon a turntable 7 carried by means of an easily moving bearing 8 upon a casing 9 secured for instance to the roof 10 of the vehicle. To enable it to tilt it is so mounted by means of the pivot 11. At the right hand side of Figure I is shown the driver's device for actuating the arrow. This device is mounted in a position where it is readily available to the driver.

Transmission of movement between this device and the arrow 2 is effected by a flexible shaft 10 consisting of a circumferentially rigid tubular case 12 and a core 13 within said casing which is rigid longitudinally and in torsion but is flexible for bending.

One end of said core 13 is rigidly fixed to a non-cylindrical plunger 14 sliding in a similarly non-cylindrical and vertical axial bore 15 of the turntable 7. Rotation of the core thus rotates the turntable and with it the arrow. The plunger is also connected by a link 16 to a point 17 on the arrow distant from the pivot 11, so that a push transmitted through the core 13 causes the plunger 14 to rise and the arrow to tilt up; whilst retraction of the core causes or allows the arrow to drop back to its horizontal position. It will be observed that the arrangement permits tilting of the arrow independently of its horizontal position.

Vertical movement of said end of the core 13 is required, but for the sake of appearance the flexible shaft should be positioned horizontally close to the roof 10 without considerable exposure, thus necessitating a bend of short radius. If the shaft case 12 is continued close to the turntable 7 and is itself sharply curved, frictional resistance to the movement of the core 13 is liable to be high. An arrangement shown and comprising the casing 9 minimizes friction at this point. The shaft case is terminated at 18 and is coupled to the side of the casing 9. The bare core is continued through the casing 9 and is guided by a swinging arm 19 pivoted to the casing at 20. The connection of said arm to the core 13 (shown in Figures I and II) comprises forks 21 on the arm, a ring 22 pivotally mounted between the forks, and a sleeve 23 rotatable within the ring and fixed to the shaft core. The sleeve 23 is retained within the ring 22 by a fixed flange 24 at its one end and a detachable flange 25 at its other end. The latter is secured to the sleeve by screws 26 which also secure the sleeve to the shaft core 13 by their pointed ends which penetrate the latter. A tension spring 27 secured to the casing 9 is arranged to pull on the free end of the arm 19 to assist in counterbalancing the arrow 2.

The turntable 7 is provided with a down-turned flange 28 which shields the bearing 8 and is formed with a slot 29 of 180° angular extent, the ends of which form stops for making contact with a fixed projection 30 on the casing 9 and thereby limit the horizontal movement of the arrow 2 in both directions. Leaf springs 31 within the casing 9 so engage a roller 32 on the turntable 7 that they give the arrow a tendency to return to its normal position when it is displaced therefrom. The springs 31 may be bent at their ends to provide hooks 33 which engage the roller and thus act as additional or alternative stops when the arrow is in its extreme rotated positions.

The form of the driver's actuating mechanism shown at the right hand of Figure I is such that its operating handle 34 can be mounted on the steering column assembly 35 above the steering wheel 36; thus necessitating a motion transmitting arrangement which extends through the steering column assembly and emerges from the lower end thereof at a position to which it is seldom feasible to bring the flexible shaft with the easy curvature which is necessary for its smooth working. The actuating mechanism is accordingly arranged to connect with the flexible shaft when the driven end 37 of the latter is directed downward and materially parallel with the steering column assembly.

38 indicates a fixed tubular member of the steering column assembly such as the lower end of the steering gear box. Fixed to it and extending upward from it is the tubular casing 39. The steering wheel 36 is attached to its hollow shaft 40 which is external to said fixed tubular casing 39; while 41 is the stationary steering column casing. At the upper end of casing 39 is the box 42 which will be more fully described hereafter. Within the casing 39 is the hollow shaft 43; and within that the sliding rod 44, the upper polygonal end 44a of which non-rotatably engages the hollow shaft 43. To the upper end of the hollow shaft 43 is fixed a disc 45. The rod 44 extends axially through said disc and is connected by link 46 to the handle lever 34. The latter is pivoted to the disc 45 at one side thereof and so as to swing in a plane perpendicular to that of the disc. At the other end it is formed as a handle 47. Thus lifting or lowering of the handle pulls up or thrusts down the rod 44; whilst side pressure on the handle causes rotation together of the handle lever 34, the disc 45 and the hollow shaft 43.

The lower end of the hollow shaft is fitted with a toothed wheel 48 which meshes with another toothed wheel 49 mounted for rotation in a casing 50. The lower end of the rod 44 is connected by link 51 to a lever 52 fulcrumed at 53 within the casing 50 and connected by link 54 to a sliding shaft 55 which is splined in the toothed wheel 49. Rotation of the latter thus rotates the shaft 55, whilst endwise movement of the rod 44 slides said shaft longitudinally. The core member 13 of the flexible shaft is fixed to shaft 55 and transmits longitudinal movement of the latter to the arrow 2 through the mechanism already described. The case 12 of the flexible shaft is fixed to the casing 50 by the nut device 56 shown which permits the longitudinal position of said case 12 in relation to the casing 50 to be minutely adjusted as is necessary for the easy movement of the core within it.

The wheel 49 is smaller than the wheel 48 whereby only a small movement of the disc 45 is necessary to swing the arrow to its extreme positions.

Since the rod 44 rotates with the handle lever 34 and the shaft 55 is also rotatable, said rod and said shaft are provided with non-rotating lower end members 57 to which the links 51, 54 are attached.

Between the fixed box 42 and the rotating disc 45 there is provided a spring detent device 58 which tends to hold the disc and the handle lever 34 in the angular position corresponding to the normal position of the arrow. Standing up from the disc 45 is a slotted quadrant 59 within which the lever 34 moves and which assists to transmit rotational movement of the lever to the disc 45. In the quadrant members are provided embossed detents 60 which spring into depressions 61 in the lever 34 when said lever is in its normal position.

It is desirable that the movement of the arrow to either of its turn-indicating positions should be rapid, whilst its restoration to its normal position can be effected more leisurely. With this in view spring flicking mechanism is arranged to drive the rotating members of the transmission, once they have been started in the desired direction from their normal position. As shown this comprises a pair of compression springs 62, each of which is enclosed within a telescopic casing 63 mounted in the box 42 by means of trunnions 64 and pin jointed to a ring 65 fastened to the hollow shaft 43. Said springs aline with and counteract one another when said shaft 43 is in the normal position. Upon rotation of the shaft being started in one direction or the other by side pressure on one side or other of the handle 47, both springs co-operate to drive said shaft to its full extent in that direction.

66 indicates a lever extending from the casing 50 and adapted when its outer end is depressed, to engage the lever 52 and thereby tilt up the arrow 2. Said lever is arranged to be actuated as the result of applying the vehicle brakes and for this purpose it is shown as connected by a compression rod 67 to a movable element 68 adapted to be depressed by the heel of the driver's foot with which he is operating the brake pedal 69.

Figure IV shows a simpler form of the driver's actuating mechanism which is suitable for use in positions where the flexible shaft can be brought to it without sharp curvature. 70 indicates a tubular body which is fixed by such means as halved clamps 71 to say the steering column casing or the instrument board.

At one end of said body 70 is a rotatable head 72 carrying the handle lever 34. The latter is linked to a rod 73 passing through the casing and fixed to the core 13 of the flexible shaft. The case 12 of the flexible shaft is secured to the body 70. The spring means described above for rotating the shaft 43 after it has been started, may be applied in this case to the rod 73.

We claim:

1. The combination with a body constrained for two independent motions, of a casing on which the body is mounted, a flexible shaft comprising a case and a rotatable and slidable core which is connected to said body to impart said motions thereto by its rotation and sliding respectively, means for independently rotating and sliding the core, and for the purpose of passing the core round a sharp curve without setting up undue friction, a portion of the core in the curve being free from the case, an arm for guiding said portion in its movement along the curve, the casing providing a pivot for the arm, and means attaching said arm to the core and permitting free rotation of the core.

2. In a vehicle signalling system, a casing adapted to be fixed to a vehicle, a turntable rotatably mounted on said casing, a signal member mounted on the turntable to rotate therewith and tiltable thereon, a flexible shaft comprising a case and a rotatable and slidable core, the case of the shaft being coupled to the wall of the casing and the core extending in a curve through the casing and connected non-rotatably to the turntable and connected to the signal member to tilt the latter by its sliding movement, a pivoted arm in the casing guiding the core in its curve, and swivelling means connecting said arm to said core.

3. In a vehicle signalling system, a rotatable and tiltable signal member, a flexible shaft comprising a rotatable and slidable core connected to said member to rotate the member by its rotation and to tilt the member by its sliding motion, a signal actuating device comprising sliding and rotatable means, a splined shaft substantially parallel with said sliding and rotatable means, gearing splined to the splined shaft and connecting said shaft and said means for rotation, and means connecting them for sliding movement, the core of the flexible shaft being fixed to said splined shaft.

ANDREW CAMPBELL.
ADOLPH GOLDSMITH.
FRED KENNEDY WHITE.